United States Patent [19]

Okumura et al.

[11] 4,099,704
[45] Jul. 11, 1978

[54] VACUUM VALVE APPARATUS

[75] Inventors: Masahide Okumura, Hachioji; Yoshio Sakitani, Ohi; Yasushi Nakaisumi; Toshiaki Nakata, both of Katsuta, all of Japan

[73] Assignee: Hitachi, Ltd., Japan

[21] Appl. No.: 752,098

[22] Filed: Dec. 20, 1976

[30] Foreign Application Priority Data

Dec. 26, 1975 [JP] Japan .............................. 50-155065

[51] Int. Cl.² .......................................... F16K 31/04
[52] U.S. Cl. .................................. 251/134; 318/474; 318/469
[58] Field of Search ................. 251/134; 318/474, 469

[56] References Cited

U.S. PATENT DOCUMENTS

| 916,831 | 3/1909 | Bettinger | 251/134 |
| 2,600,549 | 6/1952 | Ledbetter | 318/474 X |
| 3,341,760 | 9/1967 | Fry | 318/469 |
| 4,001,661 | 1/1977 | Terabayashi | 318/474 X |

Primary Examiner—Arnold Rosenthal
Attorney, Agent, or Firm—Craig & Antonelli

[57] ABSTRACT

Disclosed is a vacuum valve apparatus comprising a valve head, a motor for driving the valve head, means for checking the position of the valve adapted to issue a first signal upon detecting that the valve head is moved to be within a predetermined valve-closed range, means for checking electric current adapted to issue a second signal when the driving current for the motor is increased to a predetermined value, switching means adapted to cut the driving current supply to the motor upon detecting said second signal, and means for issuing a third signal for confirming the complete closure of the valve when both of the first and the second signals are simultaneously obtained.

10 Claims, 2 Drawing Figures

VACUUM VALVE APPARATUS

BACKGROUND OF THE INVENTION

The present invention relates to a vacuum valve system adapted to be used in a vacuum system and, more particularly, to such a vacuum valve system improved to provide a confirmation of the closing state of the valve.

DESCRIPTION OF THE PRIOR ART

In analyzing apparatus making use of charged particle beam such as electron microscopes and ion microanalyzers, as well as other charged particle beam apparatus such as electron beam working device, samples to be analyzed and work pieces to be processed are disposed within a vacuum chamber which may be referred to as a "sample chamber" which is highly evacuated by means of a vacuum pump.

The sample chamber communicates with another vacuum chamber through a first vacuum valve and with atmosphere through a second vacuum valve. Thus, the renewing of the sample is performed by a troublesome operation having a number of steps of closing the first vacuum valve between the sample chamber and the another vacuum chamber to cut the communication therebetween, opening the second vacuum valve communicating the sample chamber with ambient air to introduce an atmospheric pressure to the sample chamber, replacing the old sample with a new one, closing the second vacuum valve to disconnect the sample chamber from ambient air, evacuating the sample chamber to a predetermined vacuum and then opening the first vacuum valve to retrieve the communication between the sample chamber and other vacuum chamber.

Although above process has mainly relied upon manual operations, up to now, there is a current proposal to perform the above described operation automatically to avoid troublesomeness and possible errors.

For performing the above described operation in good order, in addition to the automatical control of the opening and the closing of the vacuum valves, it is strictly required to confirm complete opening and closing of the vacuum valves, before the operation is advanced to a subsequent step of the sequence. Namely, supposing that the second vacuum valve is opened before the first vacuum valve is completely closed, for example, the total vacuum system will be dangerously subjected to the ambient atmospheric pressure.

Conventionally, the vacuum valves have been constituted by electro-magnet valves, hydraulically actuated valves or pneumatically controlled valves, for an easier automatic operation of the vacuum valves. However, these valves inherently perform a two-position operation, i.e. capable of assuming only ON and OFF positions, and have failed to provide the confirmation of the complete closure of the vacuum valves.

SUMMARY OF THE INVENTION

It is therefore an object of the invention to provide a vacuum valve system improved to provide a confirmation of the complete closure of the vacuum valve.

It is another object of the present invention to provide a vacuum valve system, wherein an improvement resides in that the closure of the vacuum valve is ensured by a constant force applied to a valve head to bias it onto a valve seat of the vacuum valve.

According to the present invention, there is provided a vacuum valve system comprising a valve head, a motor for driving the valve head, means for checking the position of the valve head and adapted to issue a first signal upon detecting that the valve head has been moved to be within a predetermined valve-closing range, means checking electric current adapted to issue a second signal when the driving current for the motor is increased to a predetermined level, switching means for cutting the driving power supply to the motor upon detecting said second signal, and circuit means adapted to issue a third signal only when both of the first and the second signals are simultaneously obtained.

Thus, according to the invention, the complete closure of the vacuum valves are represented and confirmed by the generation of the third signal. The switching means sensitive to the second signal for cutting the driving current supply is effective to maintain a constant biasing force of the valve head onto the valve seat, thereby to provide an enhanced reliability of the closing motion of the vacuum valves.

These and other objects, as well as advantageous features of the present invention will become clear from the following description of the preferred embodiments taken in conjunction with the attached drawings in which:

DESCRIPTION OF THE PREFERRED EMBODIMENTS

Figure 1:
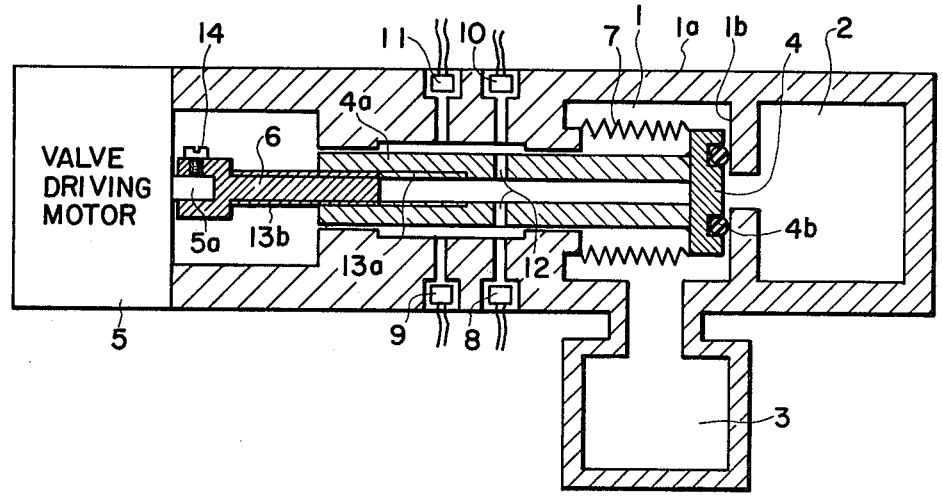
FIG. 1 is a schematic illustration of a section of a vacuum valve apparatus embodying the present invention, showing a basic structural arrangement thereof.

Referring at first to FIG. 1 showing a structural arrangement of a vacuum valve apparatus embodying the present invention, a valve room 1 is provided between a vacuum chamber 2 and another vacuum chamber 3. A vacuum-tight wall is designated at a numeral 1a, while a numeral 1b denotes a gate wall separating the valve room 1 from the vacuum chamber 2. The gate wall 1b is adapted to play an additional role of a valve seat. Numerals 4, 4a and 4b denote, respectively, a valve head, a valve stem unitarily secured to the valve head and an "O" ring secured to the valve head. A D.C. electric motor 5 has an output shaft 5a to which attached is a shaft 6 by means of a screw 14. An external thread 13b on the shaft 6 is meshing with an internal thread provided on the valve stem 4a so that the valve head 4 may be moved leftwards and rightwards, as the output shaft of the motor is rotated in one and the other directions, thereby to connect and disconnect the communication between the vacuum chamber 2 and the valve room 1. A bellows 7 which extends between the valve stem 4a and the vacuum-tight wall 1a is effective to insulate the valve room 1 from the ambient air.

As mentioned before, one of the specific features of the present invention resides in a provision of means for checking the position of the valve head for confirming that the valve head has been brought to be within a predetermined valve-closed range. To this end, lighting or luminous elements 8,9 such as incandescent lamp or illuminant diodes are disposed laterally of the valve stem 4a. At a side of the valve stem 4a opposite to the luminous elements 8,9 disposed are light detecting elements 10, 11 such as CdS photoconductive elements or photodiodes. The valve stem 4a is provided with a bore 12 adapted to be passes by a light. The arrangement is such that the light emitted from the luminous element 8 is allowed to reach the light detecting element 10 through the bore 10 when the valve head is within the valve-closed range. Therefore, the receipt of the light by the light detecting element 10 confirms that the valve head 4 has been moved to be within a predetermined valve-closed range.

Similarly, when the bore 12 is brought in alignment with the luminous element 9 and the light detecting element 11, by the leftward movement of the valve head 4, the light emitted by the luminous element 9 is allowed to reach the light detecting element 11 through the bore 12. Thus, the receipt of the light by the light detecting element 11 provides a confirmation of opening of the valve.

Another feature of the invention resides in a provision of means for checking the driving current to the motor thereby to stop the motor when the driving current is detected to have increased to a predetermined level. In general, the current through a D.C. motor, i.e. the driving current, increases as the load applied to the motor increases. Thus, it is possible to use such a D.C. motor as the motor 5 to be incorporated in the valve system of the present invention. As the current is increased to a predetermined level, the current supply to the motor is cut to stop the motor so as to maintain a constant force with which the valve head 4, i.e. the "O" ring 4b is pressed onto the valve seat 1b at the closed state of the valve. Thus, the force is maintained constant, irrespective of the change in thickness of the "O" ring due to its wearing down, thereby ensuring the initial capacity in cutting the vacuum of the valve.

However, unfortunately, the complete closure of the valve is not confirmed solely by cutting the driving current. Namely, an unexpected increase of the load attributable to an invasion of contaminants and other obstructions may cause the current to increase to that level. Thus, the increase of the driving current cannot solely be an index for the complete closure of the valve.

Similarly, the detection of the valve head within a predetermined valve-closed range cannot solely provide the confirmation of the complete closure of the valve. The lack of sufficient compression force exerted on the "O" ring may result in a leakage, even when the valve head has been moved to that range.

In order to avoid above inconveniences, according to the invention, both of the informations given by the means for checking the valve position and means for checking the driving current for the motor are taken into consideration in judging the closed state of the valve. Thus, the valve is judged to have been closed completely only when the driving current is increased to a predetermined level with the valve head having been brought into the predetermined valve-closed range.

To explain in more detail, since when the valve head is within a predetermined valve-closed range, the light from the luminous element 8 is necessarily detected by the light detecting element 10, through the bore 12. Thus, it is reasonable to judge that the valve has been moved to the valve-closed range, as far as the first signal is issued from the light detecting means 10. However, the power supply to the motor 5 goes on until the "O" ring is sufficiently compressed to increase the load, i.e. the driving current for the motor to the predetermined level. The increase of the driving current to that level is then detected by the detecting means which in turn issues the second signal to stop the motor. At this moment, the valve is completely closed with its "O" ring sufficiently compressed. Thus, the valve can be judged to have been closed completely, when both of the first and the second signals are obtained simultaneously.

The aforementioned complicated sequential operation of the vacuum system is rendered more reliable, when the valve apparatus of the invention is incorporated, since the program is advanced after confirming each complete closure of the vacuum valves, thus avoiding an erroneous operation. It will be understood that the reliability of the total vacuum system is greatly enhanced according to the invention.

Although a combination of luminous elements and light detecting elements are used as means for checking the valve positions in the foregoing embodiment, other means such as a micro-switch or a differential transformer which is known per se can fairly be used in place of the described combination. Alternatively, the valve stem may carry a magnet so that the position of the valve head may be detected by way of a change in magnetic field.

Figure 2:
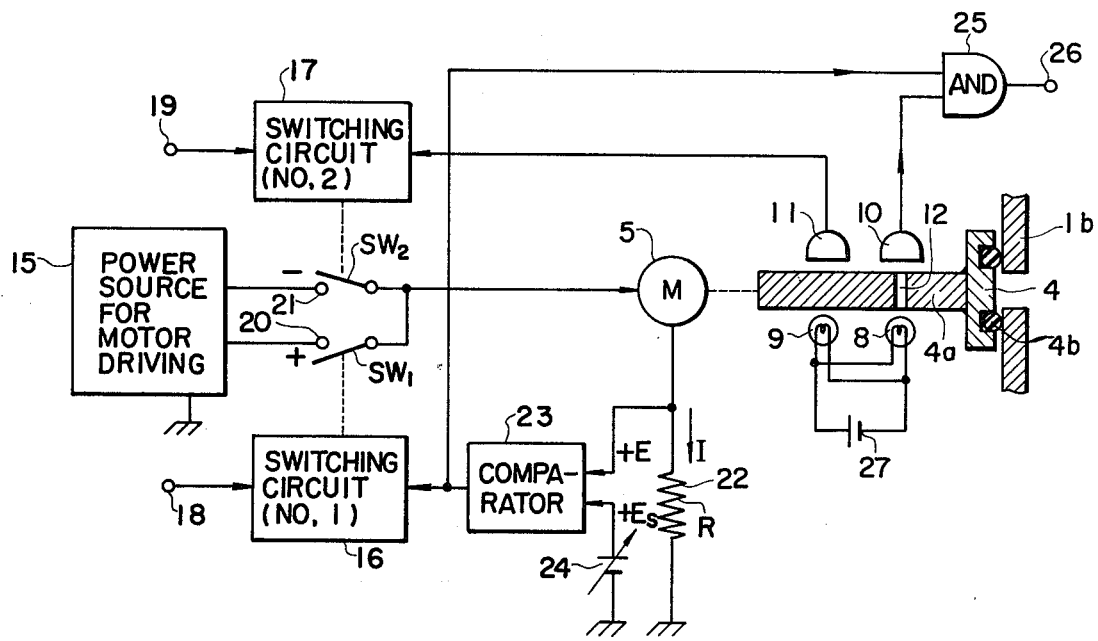
FIG. 2 shows schematically an electric circuit for the vacuum valve apparatus in accordance with the present invention.

Referring now to FIG. 2 showing an electric circuit for the valve apparatus of FIG. 1, a D.C. power source 15 for the motor is shown to have a plus and a minus terminals 20, 21. For closing the valve, a valve-closing signal is input through an input terminal 18, in response to which a switching circuit 16 acts to close a switch $SW_1$, thereby to allow an electrical current to be supplied from an output terminal 20 to the motor 5. Consequently, the motor 5 is driven in one rotational direction thereby to shift the valve head 4 rightwards.

As the valve head is moved to be within the predetermined valve-closed range, the light from the luminous element 8 is applied to and detected by the light detecting element 10, through the bore 12. The resultant signal constituting the first signal is input to one of the input terminals of an AND circuit 25.

At this state, since the other input terminal does not receive a signal, no output signal is available at the output terminal 26 of the AND circuit 25.

The current I to the motor 5 is detected as potential differential E at both sides of a current detecting resistor 22 having a resistance value of R. The potential E is input to a comparator 23, along with a reference potential Es. The comparator 23 performs the comparison and outputs the second signal when E is increased to the level of Es. The value of Es is so selected that E comes equal to Es when a desired compression is obtained on the "O" ring. Accordingly, the second signal is issued when the valve is completely closed.

The second signal is transmitted to the switching circuit 16 to open the switch $SW_1$, thereby to cut the power supply to the motor 5 to stop the latter. At the same time, the second signal is delivered also to the AND circuit 25 to generate a third signal at the output terminal 26. Thus, the third signal can be used to confirm the complete closure of the valve.

For opening the valve, a command or order signal is transmitted to a switching circuit 17 through an input terminal 19 so as to close a switch $SW_2$. Then, a negative current is supplied to the motor 5 through the minus terminal 21 thereby to reverse the motor 5. Consequently, the valve head 4 is moved leftwards away from the valve seat. As the valve is opened sufficiently, the bore 12 comes in alignment with the luminous element 9 and the light detecting element 11, so that the light emitted from the luminous element 9 comes to be received by the light detecting element 11. The resultant signal is transmitted to the switching circuit 17 thereby to open the switch $SW_2$. Consequently, the power supply to the motor 5 is cut to stop the motor.

It is to be noted that the third signal at the output terminal 26 of the AND circuit 25 is never produced, even if the driving current happens to increase to the predetermined level to produce the second signal as far as the valve head is at an intermediate position in its stroke, i.e. before the valve head is moved to be within the predetermined valve-closed range. This is because no first signal is available at one input terminal of the AND circuit 25.

It will be understood from the foregoing description that the signal for confirming the complete closure of the valve is produced only when the two requirements are simultaneously satisfied, i.e. that the valve head 4 has been moved to be within a predetermined valve-closed range and that the driving current for the motor 5 is increased to a predetermined level. Therefore, when the present invention is applied to a sequence control of the valves in a vacuum system, the program is advanced after confirming the complete closure of the valve without fail, so that any erroneous operation of the system can be avoided.

In addition, the constant compression force on the "O" ring ensured by the present invention provides an enhanced reliability of the closure of the valve, as well as a longer life of the "O" ring avoiding an application of excessively large compression force.

What is claimed is:

1. A vacuum valve apparatus comprising a valve head, a motor for driving said valve head, and means for confirming complete closure of said valve head, said means for confirming comprising first signal generating means for detecting the position of said valve head and generating a first signal when said valve head is situated within a predetermined valve-closed range, second signal generating means for detecting the driving current of said motor and generating a second signal when said driving current has reached a predetermined level, and third signal generating means for generating a third signal only when both of said first and second signals are generated.

2. A vacuum valve apparatus as claimed in claim 1, comprising switching means for cutting the power supply to said motor in response to said second signal.

3. A vacuum valve apparatus as claimed in claim 1, wherein said third signal generating means is operable to generate said third signal only when both of said first and second signals are simultaneously generated.

4. A vacuum valve apparatus as claimed in claim 3, further comprising a switching means for cutting the power supply to said motor in response to said second signal.

5. A vacuum valve apparatus according to claim 1, wherein said third signal generating means comprises an AND circuit operatively associated with said first and second signal generating means.

6. A vacuum valve apparatus according to claim 2, wherein said third signal generating means comprises an AND circuit operatively associated with said first and second signal generating means.

7. A vacuum valve apparatus according to claim 1, wherein said first signal generating means comprises a light source means and a light detector means.

8. A vacuum valve apparatus according to claim 7, wherein said light source means interacts with said light detector means through said valve head when said valve head is situated within said predetermined valve-closed range.

9. A vacuum valve apparatus according to claim 5, wherein said first signal generating means comprises a light source means and a light detector means.

10. A vacuum valve apparatus according to claim 9, wherein said light source means interacts with said light detector means through said valve head when said valve head is situated within said predetermined valve-closed range.

* * * * *